United States Patent [19]
Taylor

[11] 3,865,733
[45] Feb. 11, 1975

[54] APPARATUS FOR THE PRODUCTION OF OZONE

[76] Inventor: Leland Thomas Taylor, 701 Madison St., N.E., Albuquerque, N. Mex. 87110

[22] Filed: Jan. 30, 1974

[21] Appl. No.: 437,729

[52] U.S. Cl. ................................ 250/532, 250/539
[51] Int. Cl. ............................................. C01b 13/12
[58] Field of Search ........................... 250/531–540

[56] References Cited
UNITED STATES PATENTS
1,588,976   6/1926   McBlain .......................... 250/539 X FOREIGN PATENTS OR APPLICATIONS
6,105   6/1908   Great Britain ...................... 250/532

Primary Examiner—John H. Mack
Assistant Examiner—Aaron Weisstuch
Attorney, Agent, or Firm—Eyre, Mann & Lucas

[57] ABSTRACT

Apparatus for the production of ozone is disclosed. The apparatus comprises two or more electrically conductive wires each encased in an insulating material being brought into contact with each other. The principal advantage of the apparatus of the present invention is its durability.

10 Claims, 7 Drawing Figures

APPARATUS FOR THE PRODUCTION OF OZONE

The production of ozone by passing oxygen through an electrically charged atmosphere is well known. Various methods are in use today and they basically involve breaking oxygen ($O_2$) into atoms (0) so that when the atoms regroup they regroup as ozone ($O_3$).

A typical apparatus suitable for converting oxygen to ozone is a pair of parallel plates each of which is charged. The charged plates convert oxygen to ozone as hereinbefore described. Methods of performing this operation have been patented e.g., U.S. Pat. Nos. 2,989,144,1,396,222,3,198,726,3,309,304,3,335,080 and 3,622,492. While each of these patents teaches the parallel plates method, each of them is, of course, an improvement on the basic apparatus. The principal problem with the parallel plate method of producing ozone is that the plates must be kept perfectly parallel. Even the slightes misalignment of the plates will materially reduce the amount of ozone produced per unit of charge. As a result it will be appreciated that the parallel plate apparatus is quite delicate.

A second method of producing ozone is in a cylindrical tube wherein a central wire serves as one electrode and an outer shell serves as a second electrode. Typical teachings of this type of ozone generator may be found in U.S. Pat. Nos. 2,658,868,3,661,763, 3,654,126, and 3,421,999. As with the parallel plate apparatus, a tubular apparatus is also quite fragile not only because the central electrode must be maintained in its proper spatial relationship to the peripheral electrode, but also because the peripheral electrode is usually separated from the central core by a glass envelope, the glass envelope of course being quite fragile.

A third known method of producing ozone gas is between a pair of parallel neon filled glass tubes, the glass tubes being charged and serving as the electrodes. Because of the fragility of this system, it does not have widespread acceptance.

In accordance with the present invention these disadvantages of prior art devices, and especially the fragileness of the prior art devices, is overcome. The means for accomplishing this is by having two or more electrically conducting wires serve as the electrodes. Each of the wires is covered with a material which is inert to ozone and the two insulated wires are in abutment. It has been found that Teflon (DuPont's trademark for a tetrafluoro ethylene) is very suitable for this purpose. When the two wires are charged, an electrical field is set up between them. When oxygen is passed by the electrically charged conductors it is converted to ozone in the manner hereinbefore described. If desired, the electrical conductors can be formed into a fabric e.g., by weaving. Oxygen can then be passed through the fabric wires, preferably in a direction perpendicular to the plane of the fabric, and the oxygen will be converted to ozone.

The present application, especially when speaking of woven fabrics, is distinguished from the prior art in that the two electrodes are in immediate abutting relationship with each other and are automatically spaced by the thickness of the insulation. It is not necessary to use exterior means to hold them in perfect alignment as is true in prior art devices. As a result, the problem of fragility of the apparatus is substantially reduced.

The electrode core will normally be a standard metal conductor such as copper, brass or aluminum or a noble metal such as gold, silver or platinum. However, it is contemplated within the present invention that the electrode core could be an impregnated resinous material or carbon. The necessary feature of the electrode wires of the present invention is that they be solid yet of sufficient ductility so that they can be intertwined.

The insulating material which covers the conductor can be any material which is inert to ozone and which has sufficient ductility to be formed into a fabric or braid. Saturated hydrocarbon or fluorocarbon materials will normally be suitable. Obviously glass and mica are not suitable materials. As mentioned hereinbefore, Teflon is suitable and is the preferred material. Other suitable insulating materials include polyimide films and resins such as Kapton, polyester films such as Mylar and Celanar and acetyl resins such as Delrin. Other materials suitable for the purpose will be readily apparent to those skilled in the art.

These and other features of the present invention may be more fully understood with reference to the drawings in which:

FIG. 1 shows in cross section the simplest embodiment of the present invention;

FIGS. 2, 3, and 4 show various configurations for the arrangement of FIG. 1;

Figure 1:
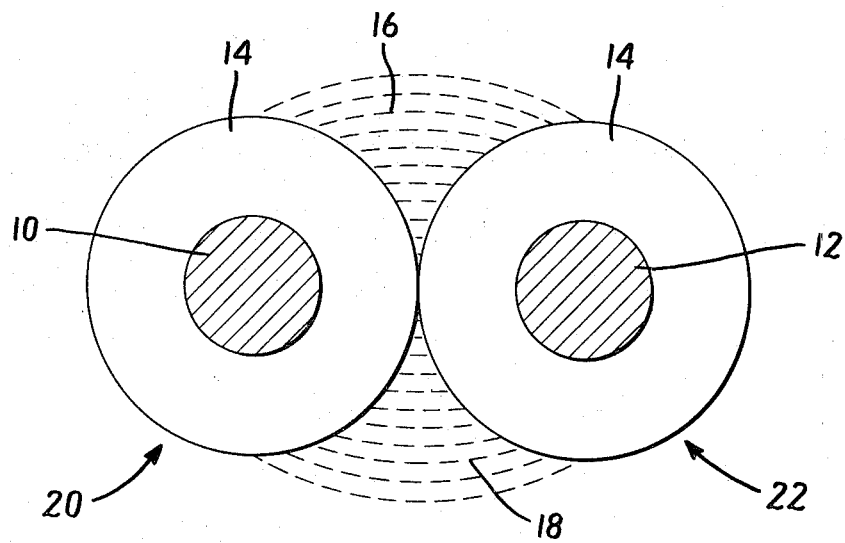

Referring now to FIG. 1 there are shown two electrical conductors 10 and 12 each of which is surrounded by an insulating material 14. The purpose of the insulating material 14 is to protect the conductors 10 and 12 from corrosion during the process of producing the ozone gas and also to separate the two conductors so that they do not short or arc out. The thickness of the insulating material 14 is sufficient to protect the conductors from the ozone gas but at the same time is thin enough to establish in cooperation with the charge supplied a field of sufficient strength for ionization of the oxygen to be converted to ozone. Where the charge supplied is 4,600 volts at 60 hz. and the conductor is number 12 Multi-Strand gauge copper, a suitable thickness for a Teflon insulator would be 1 mm.

Oxygen gas is fed to the field established by the two charged wires, preferably in a direction perpendicular to the cross section of the wires, and this oxygen gas is converted to ozone in the primary interaction spaces 16 and 18 indicated by the shaded areas.

Figure 2:
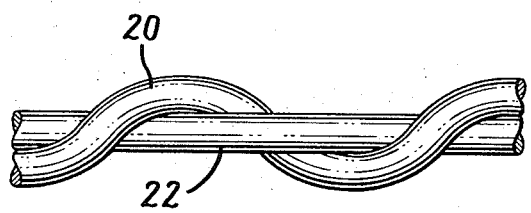
Figure 3:
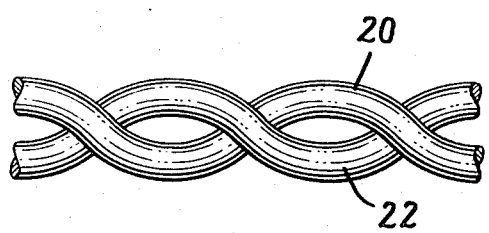
Figure 4:
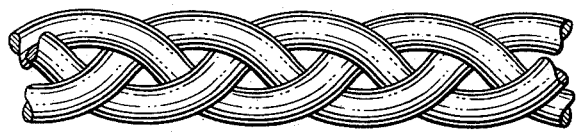

FIGS. 2, 3, and 4 show various ways in which the wires 20 and 22 of FIG. 1 can be abutted. The arrangement of FIG. 2 is a simple twisted configuration and is suitable for single phase operation. The arrangement of FIG. 3 is a dual twisted configuration and is also suitable for single phase operation. The arrangement of FIG. 4 is a braided configuration with a plurality of wires and is suitable for three phase or two single phase operations. It will be readily understood that the arrangements of FIGS. 2, 3, and 4 are illustrative only and are not limiting.

Figure 5:
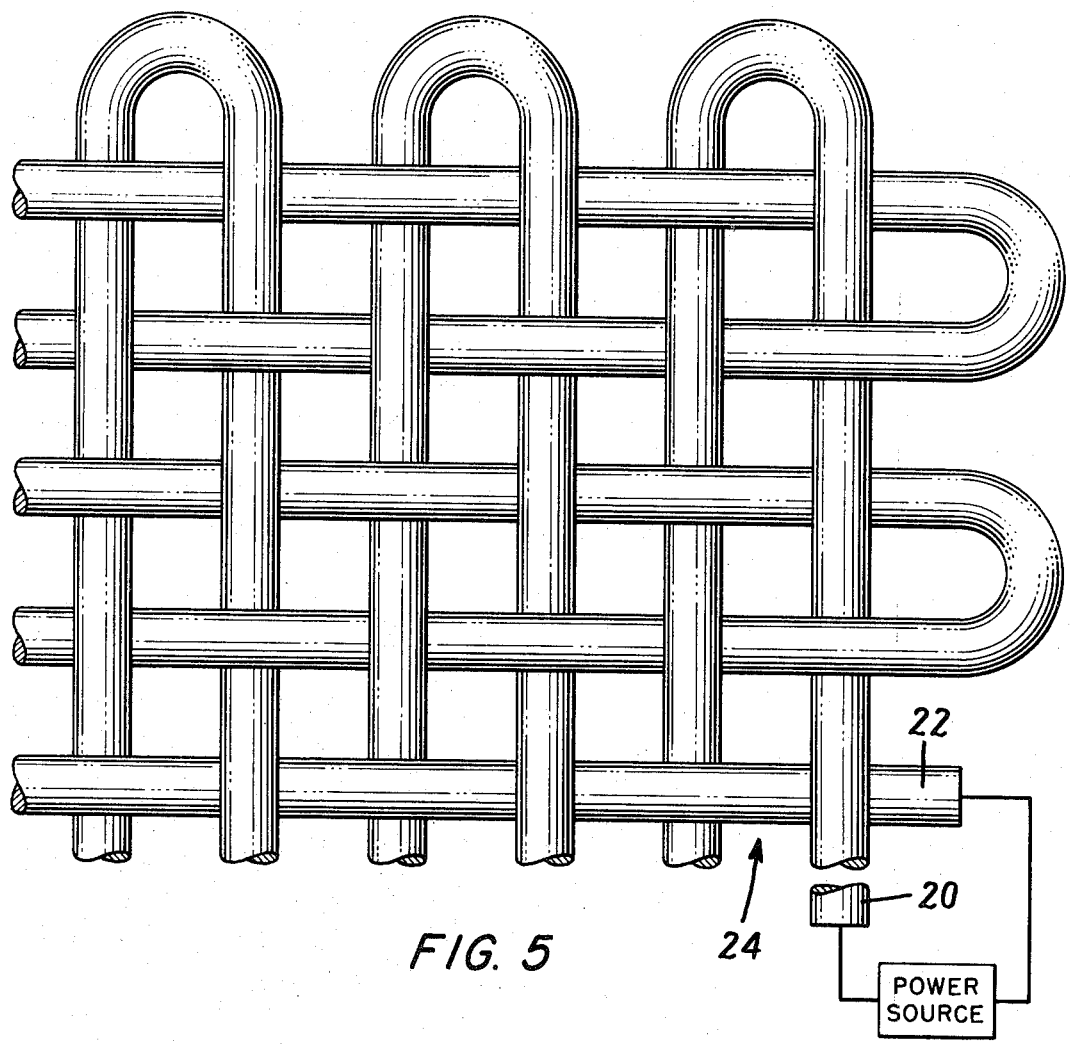
FIG. 5 shows a typical woven fabric in accordance with the present invention.
Figure 6:
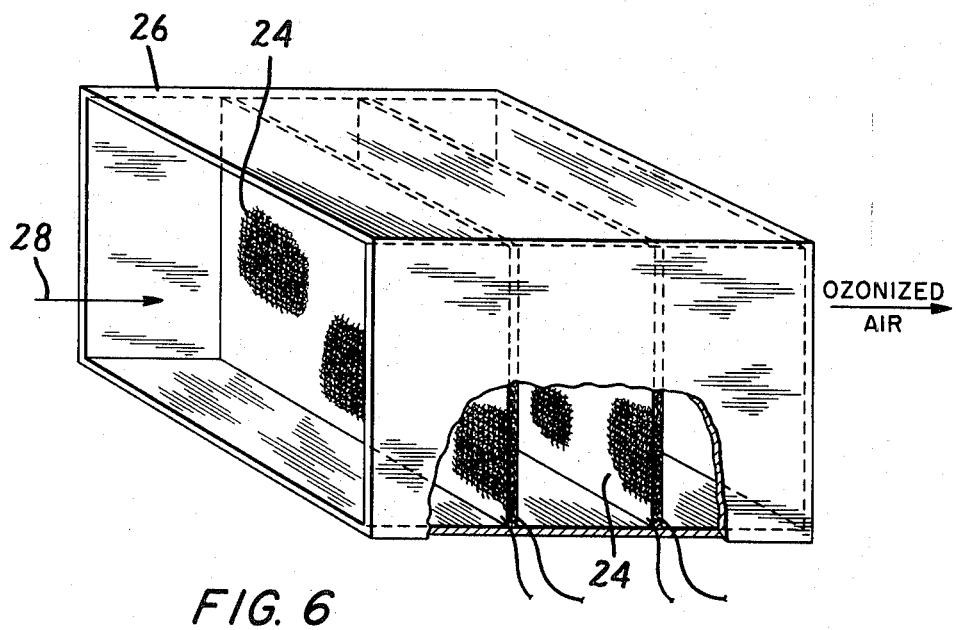
FIG. 6 shows the woven fabric of FIG. 5 in use.

In FIG. 5 is shown an alternative embodiment in which the wires 20 and 22 are interwoven. In this case ozone is produced by passing oxygen through the fabric, preferably in a direction perpendicular to the surface plane of the fabric. This is more fully illustrated in FIG. 6 wherein two of the fabrics 24 of FIG. 5 are employed in a duct 26 and oxygen flow is in the direction of the arrow 28 i.e., perpendicular to the plane of the fabric.

Figure 7:
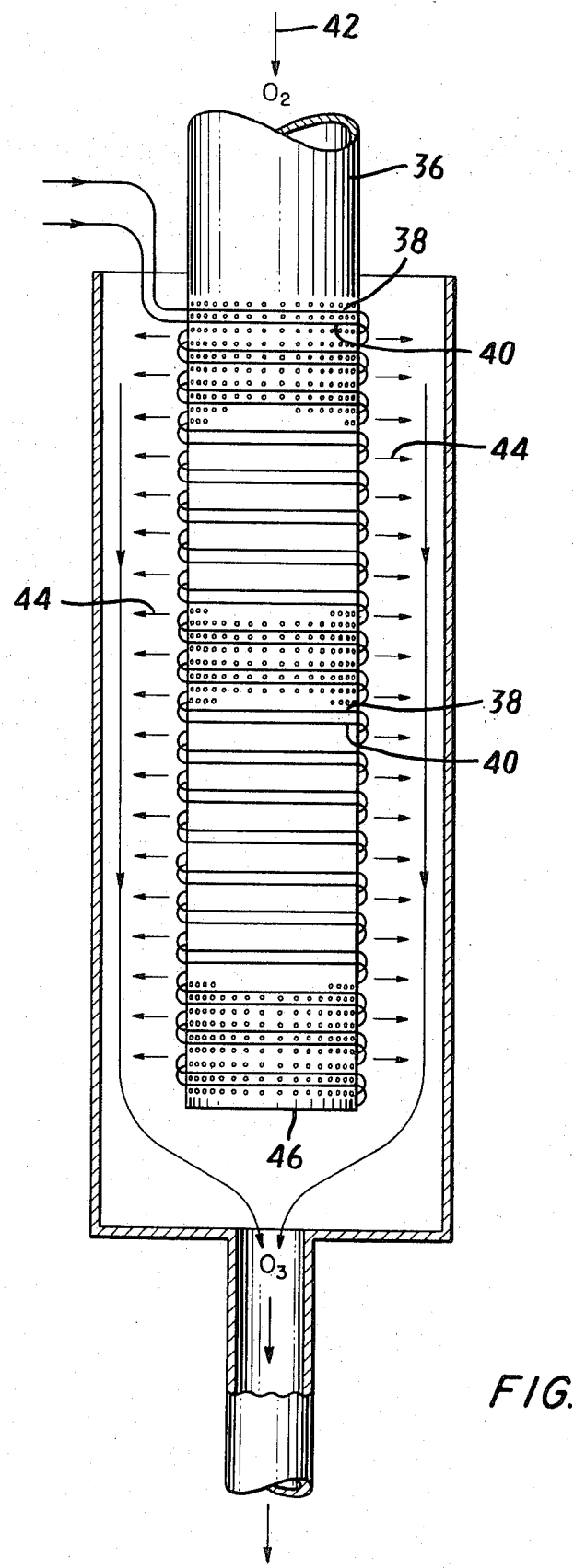
FIG. 7 shows a preferred form of the apparatus of the present invention.

In FIG. 7 is shown the preferred embodiment of the present invention. About a perforated tube 36 are wrapped electrode wires 38 and 40, the wires being in abutting relationship as shown. Oxygen is passed into the ozone generator in the direction of the arrow 42 and passes through the perforated tube as shown by arrows 44. The end 46 of the perforated tube 36 is preferably closed so that all air coming into the generator passes through the perforations and is subjected to the ionizing current.

It will be readily apparent that there are a number of advantages with the described insulated wire system as opposed to known processes for the production of ozone. In addition to resistance to mechanical shock as previously mentioned, the system of the present invention has improved temperature resistance. Furthermore, because the electrodes are in abutting relationship, the size of the apparatus to produce the ozone can be substantially reduced. It follows quite naturally that because of the reduced size of apparatuses according to the present invention, output per volume is substantially increased. Additionally, because the electrodes are inherently spaced from each other due to the rigidity of insulation and it is not necessary to maintain them by outside means, the device of the present invention is easily configurable and thus has very wide application. For example, it can be very advantageously used as a woven mat in the intake of an air system for ozonization of large volumes of air. Where such a result is desired with existing ozonization apparatuses, it is necessary to re-route the air ducting to the special ozonization apparatus.

Because of the automatic positioning of the electrodes with respect to each other which is done by controlling the thickness of the insulation, production costs for making an ozonization apparauts are substantially reduced as compared to prior art devices. Because of closeness of the conductors due to the relatively thin separator, high field strengths can be obtained with relatively low input voltages as compared to prior art devices, this being an additional economical advantage.

While general reference in this application has been made to the passage f oxygen through the apparatus in order to form ozone, it will be understood that it is not intended to limit the application to pure oxygen. In fact, by far the more common experience will be to convert the oxygen in air to ozone. In light of this it will be understood that when the term "oxygen" is used it is intended to mean a gas which contains oxygen.

It will be understood that the claims are intended to cover all changes and modifications of the preferred embodiments of the invention, herein chosen for the purpose of illustration, which do not constitute departures from the spirit and scope of the invention.

What is claimed is:

1. Apparatus for the conversion of oxygen to ozone comprising:
    a. at least two mutually interwoven abutting wire electrodes;
    b. each of said at least two electrodes comprising an electrically conductive core and an insulating cover, said insulating cover being substantially inert to ozone;
    c. means for charging each of said two electrodes to establish a corona discharge area between said electrodes;
    d. the insulating cover being of sufficient thickness to protect the core from attack by ozone but being thin enough to permit establishment of a field of sufficient strength to ionize oxygen at the rate of charge supplied; and
    e. means for directing oxygen at the corona discharge area between said electrodes;
    f. whereby ozone is formed in the corona discharge area of the two electrodes.

2. The apparatus of claim 1 wherein the insulating cover is Teflon.

3. The apparatus of claim 1 wherein the electrically conducting material is copper.

4. The apparatus of claim 1 wherein the electrically conducting material is aluminum.

5. The apparatus of claim 1 wherein the two wire electrodes are in a simple twisted configuration.

6. The apparatus of claim 1 wherein the wire electrodes are in a dual twisted configuration.

7. The apparatus of claim 1 wherein there are more than two wire electrodes.

8. The apparatus of claim 7 wherein the electrodes are in a braided configuration.

9. The apparatus of claim 1 wherein the electrodes are in a mutually interwoven fabric configuration.

10. The apparatus of claim 1 wherein the electrode wires are wrapped about a perforated tube.

* * * * *